May 10, 1955  R. A. GIERLICH  2,707,835
GAGE BLOCK HOLDER
Filed Nov. 30, 1953  3 Sheets-Sheet 1

Inventor
Raymond A. Gierlich
By ...
Attorney

Inventor
Raymond A. Gierlich
By
Attorney

May 10, 1955
R. A. GIERLICH
2,707,835
GAGE BLOCK HOLDER
Filed Nov. 30, 1953
3 Sheets-Sheet 3
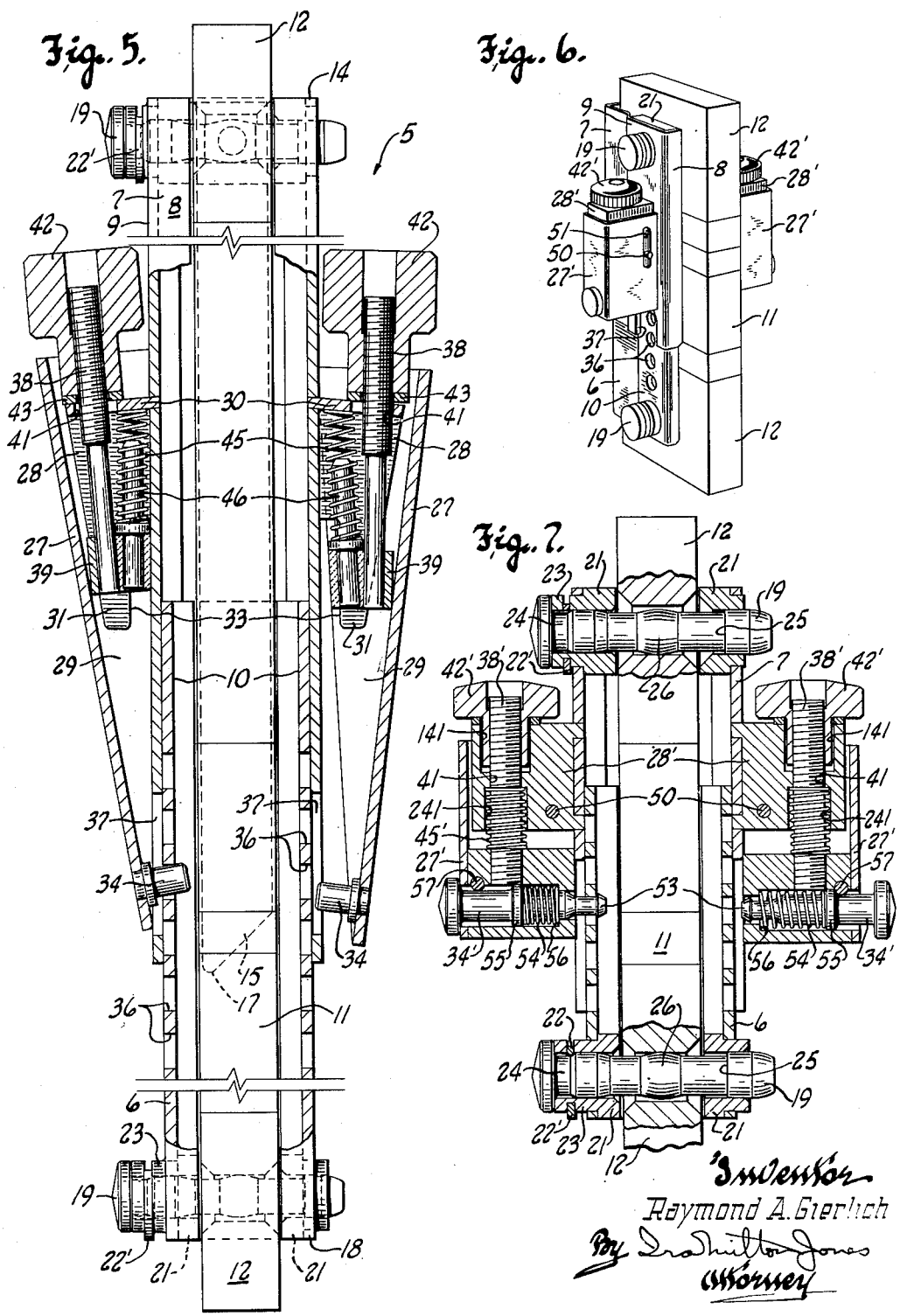
Inventor
Raymond A. Gierlich

United States Patent Office 2,707,835
Patented May 10, 1955

2,707,835

GAGE BLOCK HOLDER

Raymond A. Gierlich, Jordan, Minn., assignor to Continental Machines, Inc., Savage, Minn., a corporation of Minnesota Application November 30, 1953, Serial No. 395,144

11 Claims. (Cl. 33—168)

This invention relates to gage block holders and refers more particularly to improvements in gage block holders of the type forming the subject matter of my copending application, Serial No. 285,349, filed April 30, 1952, now Patent No. 2,680,911.

In general, the aforesaid copending application relates to a gaging instrument comprising telescoping inner and outer channels having open ends and adapted to embrace a stack of wrung-together gage blocks clamped between gaging instrumentalities swivelably mounted at the remote ends of said channels. The gaging instrumentalities may comprise gage blocks of various kinds, or scribes, trammels, or combinations of such members, and the gaging dimension between the gaging points or surfaces of the gaging instrumentailities is established by the height of the stack of gage blocks clamped between them. The opposed inner faces of such gaging instrumentalities or end pieces, between which the gage blocks are clamped, are precisely finished gaging surfaces.

Such a holder permits a stack of gage blocks to be handled as a readily portable unit, and thus greatly increases the utility of a gage block set. However, it will be obvious that the gage blocks must be securely clamped in the holder, since such blocks would tend to lose their extremely precise gaging accuracy if permitted to fall or if otherwise roughly handled. Moreover, the entire clamping force upon the gage blocks in the stack must be exerted from the opposite ends of the stack.

It follows that it is extremely important that a gage block holder of the character described be provided with tensioning means which will draw the remote ends of the telescoping channels toward one another with very substantial force so that a stack of gage blocks in the holder will be securely clamped between the gaging instrumentalities at the ends of the channels. At the same time, such tensioning means should be simple and rugged in construction, quick and easy to operate, and should apply endwise tension to the channel members substantially along the longitudinal center line of a stack of gage blocks in the holder.

Accordingly, it is an object of the present invention to provide a gage block holder of the character described having improved tension means for drawing the remote ends of the telescoped channels comprising the holder toward one another with very substantial force, so as to securely clamp into the holder a stack of gage blocks held between gaging instrumentalities or gaging end pieces swivelably mounted at the remote ends of the channels.

Another object of this invention resides in the provision of improved tension means in a gage block holder of the character described, which tension means is simple and sturdy in construction, easy to operate, and exerts endwise tension along the channels substantially on the centerline of a stack of gage blocks held therein, avoiding any uneven stress upon the blocks which might tend to distort them and impair their dimensional precision.

Still another object of this invention resides in the provision of tension means for a gage block holder of the type comprising inner and outer telescoping channels, in which the tension means features a pinlike dog carried by a tension member on the outer channel and engageable in any one of a series of longitudinally spaced holes in the inner channel, through a lengthwise slot in the outer channel, and which dog is readily insertable into and removable from such holes to facilitate and expedite adjustment of the tension means.

A further object of the present invention is to provide tension means as set forth in the preceding object wherein the dog is biased away from engagement in the holes in the inner channel, but wherein the application of tension to the holder by readily adjustable screw means firmly secures the dog in any one of such holes and precludes its withdrawal therefrom in response to such bias.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate two complete examples of the physical embodiments of the invention constructed according to the best modes so far devised for the practical application of the principles thereof, and in which:

Figure 5 is a front view of the Figure 1 gage block holder, principally in longitudinal section;

Figure 6 is a perspective view of a modified embodiment of the gage block holder of this invention;

Figure 7 is a front view, principally in longitudinal section, of the Figure 6 gage block holder;

Figure 1:
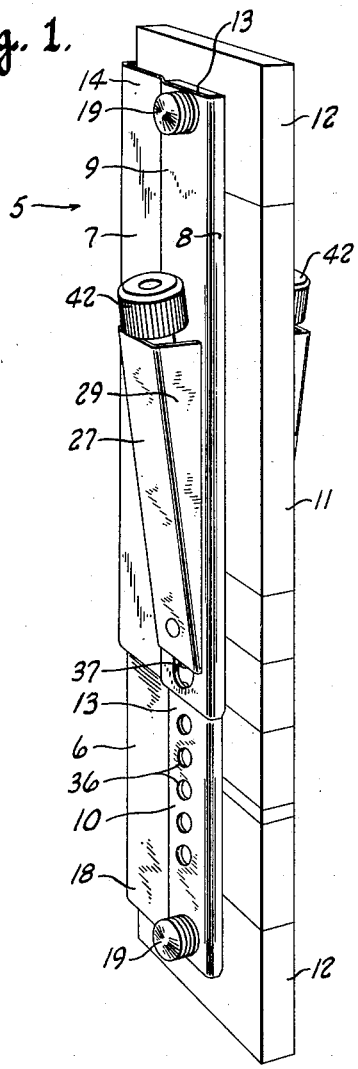
Figure 1 is a perspective view of a gage block holder embodying the principles of this invention.
Figure 2:
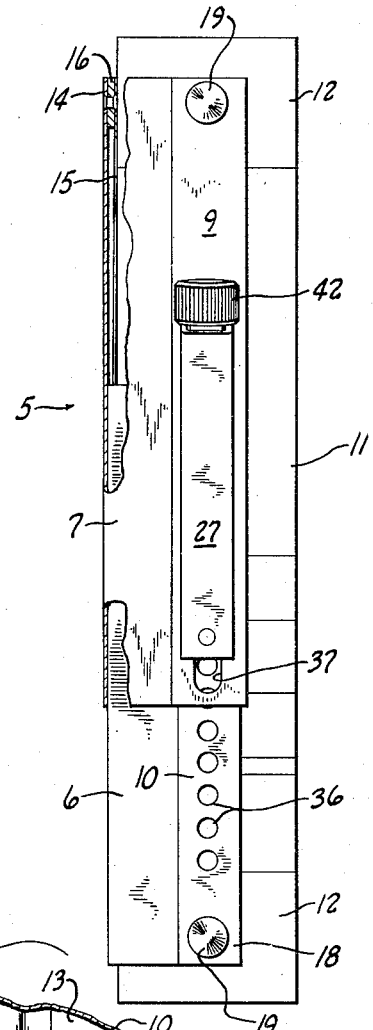
Figure 2 is a side elevational view of the Figure 1 gage block holder with portions broken away.
Figure 3:
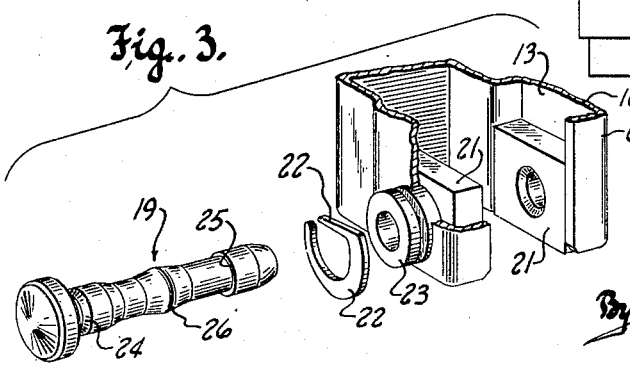
Figure 3 is an exploded partial perspective view of the end portion of one of the channels comprising the holder and the swivel mounting means for holding a gaging instrumentality therein.
Figure 4:
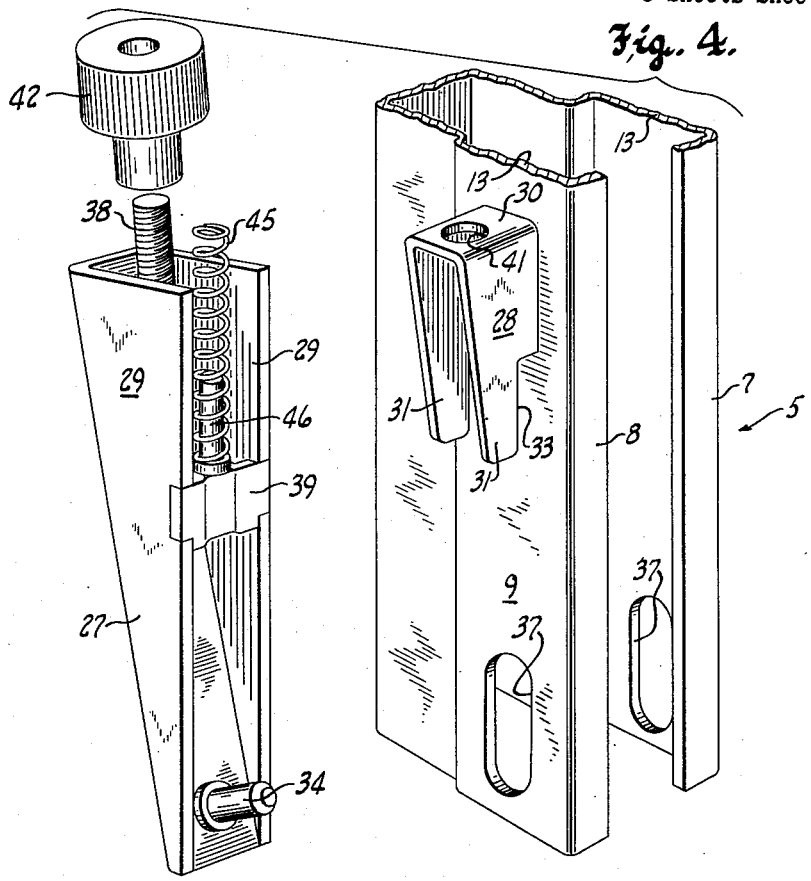
Figure 4 is an exploded partial perspective view of the tension means of the Figure 1 device.

Referring now more particularly to the accompanying drawings, in which like numerals designate like parts throughout the several views, the numeral 5 designates generally a gage block holder comprising telescoped inner and outer channels 6 and 7 respectively. The two channels are generally similar to those which comprise the holder of my aforesaid copending application and are nested together with their webs flatwise adjacent to one another. They are constrained to lengthwise telescoping adjustment and are precluded from lateral separation by ledges 8 on the outer edge portion of the flanges 9 of the outer channel, bent inwardly to overlie the outer edges of the flanges 10 on the inner channel. A stack of gage blocks 11 may be clamped between gaging instrumentalities or end pieces 12 swivelably mounted on the remote or outer end portions of the channels and which may comprise a pair of gage blocks as shown in Figure 1. Since the opposed inner faces of the two end pieces are accurately finished gaging surfaces, the gaging dimension of the composite instrument is established by the height of the stack of gage blocks plus the heights of the end pieces, and for the same reason the clamping engagement of the end pieces with the gage blocks in the stack held between them keeps the end pieces properly oriented when the instrument is in use.

As best seen in Figure 5, the flanges 9 of the outer channel are spaced apart a distance such as to embrace and guidingly engage the flanges 10 of the inner channel, and the flanges of the inner channel are spaced apart a distance substantially greater than the thickness of a standard gage block, so that when a wrung-together stack of gage blocks is secured in the holder the side faces of the blocks may be spaced from the flanges of the channels and thus the blocks will be insulated from any heat which might be imparted to the channels by the hand of a user. So that the inner edges of the ledges 8 will clear the sides of the gage blocks the front marginal edge portions of the flanges 9 and 10 of both channels are offset outwardly, as at 13, so that the inner edges of the ledges will not be closer together than rear portions of the flanges of the inner channel.

Considering the end 14 of the outer channel in which the end piece is mounted as the top of the holder, a long, narrow guard 15, preferably of thin and somewhat springy material, is secured at its upper end to the web of the outer channel, near the top thereof, being spaced from the channel web by a small spacer 16, the thickness of which is slightly greater than that of the web of the inner channel, and this guard extends downwardly, overlying the front face of the inner channel web to prevent the upper end of the inner channel from catching on slightly projecting gage blocks in a stack held in the channels as the channels are telescoped together. The guard also insures that the rear faces of the blocks will be spaced slightly from the webs of the channels, and to that end the lower portion of the guard is very slightly curled rearwardly, toward the channel webs. To facilitate insertion of the inner channel web between the guard and the web of the outer channel, the guard is sufficiently long so that its lower end portion extends slightly beyond the lower end of the outer channel web, as at 17.

The gaging end pieces are swivelably mounted on the remote ends 14 and 18 of the outer and inner channels, respectively, by means of pins 19, each of which spans the flanges of a channel and extends through a transverse hole in the end piece. A pair of bushings 21 secured in the offsets of the channel flanges mounts each pin for endwise movement between an operative position, spanning the channel flanges, and a withdrawn position, projecting to one side of one of the flanges, in which end pieces can be removed and inserted. A finger 22 on a C-washer 22' confined in a circumferentially grooved boss 23 on one bushing, reaches into the bore of the boss, as best seen in Figure 7, to engage in a circumferential groove 24 in the pin, near the head thereof, to thus provide a detent which defines the operative position of the pin but which yieldingly resists axial displacement of the pin to its withdrawn position. The finger 22 also prevents complete withdrawal of the pin from the holder by its engagement with an abrupt annular shoulder 25 on the pin in the released position thereof.

At its middle the pin has a circumferential convex ridge 26 which loosely fits the hole in the end piece so that the wall of the hole through the end piece makes point contact with this ridge on the pin, thus permitting the end piece to have a limited degree of free swiveling motion.

The means by which the channels are tensioned to draw their remote ends toward one another and thus place stacked gage blocks under clamping force between the end pieces comprises, in general, a pair of elongated channel-shaped tension members 27, each mounted on and having its flanges guidingly embracing a bracket 28 rigidly mounted on the exterior of the adjacent flange of the outer channel. These tension members overlie the flanges of the outer channel, and since they are disposed laterally opposite one another on the outer sides of the channel 7, they may exert an evenly distributed clamping force on the gage blocks in the holder.

In the embodiment of the invention illustrated in Figures 1, 2, 4 and 5 the tension member has downwardly tapering flanges 29 and each bracket 28 is substantially U-shaped and is secured to a flange of the outer channel, as by welding, with the bight 30 of the U extending laterally outwardly from the flange and with the legs 31 of the U extending downwardly, lengthwise of the channel. The legs of the bracket are spaced from the adjacent outer face of the channel flange at their lower end portions to define a downwardly opening slot 33 under each of them, the purpose of which slots will appear presently.

Near the lower end of each tension member a pinlike dog 34 is secured to the web thereof with its axis perpendicular to the web. As best seen in Figure 5, the dog may be hooked into any one of a series of longitudinally spaced holes 36 in the flange of the inner channel, through an elongated aperture 37 in the outer channel flange, spaced beneath the bracket.

A tension rod 38 is secured at its bottom to an anchor 29 which bridges the flanges of the tension member, intermediate its ends (see Figure 4), and the tension rod projects upwardly from the anchor between and substantially parallel to the flanges of the tension member. The upper end portion of the tension rod is threaded and extends through a loosely fitting hole 41 in the bight of the bracket. A knurled nut 42 threaded on the tension rod reacts downwardly against the bracket as it is rotated in one direction to thus draw the tension member upwardly and thereby draw the remote ends of the telescoped channels toward one another. A washer 43 between the bracket and the nut facilitates rotation of the latter.

Since the anchor fits loosely in the slots 33 between the legs of the bracket and the flange of the outer channel, the tension member may be said to have a loose hinge connection with the bracket, being pivotable about the connection between the tension rod and the bight of the bracket to carry the dog laterally toward and from the flange of the inner channel. The engagement of the anchor with the legs of the bracket defines the outward limit of swinging motion of the bracket, and the depth of the slots 33 is sufficient to permit the tension member to move up and down a distance substantially equal to the center-to-center distance between adjacent holes 36 in the inner channel flange. It will be understood that the centers of the holes 36 in the flanges of the inner channel are on a line joining the centers of the end piece supporting pins 19, so that the tension force exerted by the tension members is imposed through the centers of the gaging faces of the several gage blocks clamped in the holder.

To facilitate adjustment of the tension means, each of the tension members is biased downwardly and is also biased to swing in the direction to carry its dog away from its adjacent channel flange. Thus when tension is released from the tension rods by loosening the nuts 42, the tension members automatically assume a released position in which their dogs are disengaged from the inner channel and the channels are free for endwise telescoping adjustment. A single coiled compression spring 45 for each tension member, reacting between the bight of the bracket and the anchor, provides such bias. An elongated pilot 46 secured to the anchor extends upwardly a substantial distance into the coils of the spring to hold it against lateral displacement, and the pilot is disposed to position the spring between the tension rod and the adjacent flange of the outer channel so that the spring exerts its force on an axis spaced from the pivot connection established by the tension rod and the bight of the bracket.

Attention is directed to the fact that the pinlike dogs extend inwardly from the tension members substantially perpendicularly to the webs thereof, so that when the dogs are engaged in the flanges of the inner channel they are disposed at a slight upward angle due to the downwardly convergent disposition of the webs of the tension members permitted by the taper of the flanges thereon. Thus the dogs are hooked securely into the holes in the flanges of the inner channel as soon as tension is applied to the tension members and resist lateral displacement out of the holes.

The embodiment of the invention shown in Figures 6 and 7 is particularly suitable for gage block holders having relatively short channels. The brackets 28', like those in the first described embodiment, are secured to the flanges of the outer channel laterally opposite one another, but they are block-like and the bore 41' therethrough has upwardly and downwardly opening counterbores 141 and 241.

The lower portion of the channel-shaped tension member 27' comprises a bushing in which a pinlike dog 34' is endwise movably mounted. Since in this embodiment of the invention the dog is movable with respect to the tension member, the tension member is constrained to lengthwise motion on the bracket (which it embraces) by means of a pin 50 extending through the bracket and projecting into a lengthwise elongated slot 51 in each flange of the tension member.

A tension rod 38' is anchored in the bushing-like portion of the tension member, as by being threaded and brazed thereinto, and extends upwardly therefrom through the bore and counterbores in the bracket. The upper end portion of the tension rod is threaded and, as in the first described embodiment of the invention, a knurled nut 42' is threaded on the tension rod and reacts against the bracket, so that the tension member is raised in consequence of rotation of the nut in one direction.

The tension member is biased downwardly by means of a coiled compression spring 45' surrounding the tension rod and reacting between the bracket and the bushing-like lower portion of the tension member. The upper portion of the spring extends upwardly into the downwardly opening counterbore 241 in the bracket and the reduced diameter lower portion of the nut is received in the upwardly opening counterbore 141.

The pinlike dogs 34' are provided with slightly enlarged heads 53 at their inner ends to overlie edge portions of the holes in the inner channel in the operative position of the dogs, and thus resist displacement of the dogs out of the holes. The heads of course have a diameter smaller than the holes to permit insertion of the dogs into the holes and withdrawal therefrom when the tension member is not under tension. To facilitate telescoping adjustment of the channels, each of the dogs is biased outwardly, i. e., away from its adjacent channel flange, by means of a coiled compression spring 54 reacting between a circumferential flange 55 on the dog and an inwardly facing shoulder 56 on the tension member defined by the junction of a bore and counterbore in which the dog is mounted. The outwardly facing shoulder defined by the flange 55 on each dog is cooperable with an abutment pin 57 to provide a stop defining the limit of outward axial motion of the dog.

Both of the embodiments of the holder of this invention are used in substantially the same manner. A stack of gage blocks selected to provide the required gaging dimension is inserted between the flanges of the channels with the tension nuts loosened so that the dogs are spread apart and are disengaged from the flanges of the inner channel. The gage blocks need not be wrung together because they will be subjected to clamping pressure in the holder. Preferably the gage blocks to be inserted in the holder are aligned edgewise on a flat surface, with the gaging faces of the blocks perpendicular to said surface and contiguous to one another. The channels are manually extended to dispose the end pieces at a distance from one another which enables them to loosely encompass the ends of the row of gage blocks and the holder is set in place over the row of blocks. The channels are then endwise contracted manually until the end pieces engage the endmost blocks in the stack, and the dogs are then aligned with the nearest holes in the inner channel and manually engaged therein while the nuts are tightened to exert the desired clamping force. Release of the gage blocks from the holder is readily effected by loosening the nuts whereupon the dogs will disengage from the holes in the inner channel, permitting manual endwise separation of the channels to the point where the gage blocks may be readily removed therefrom.

Figure 8:
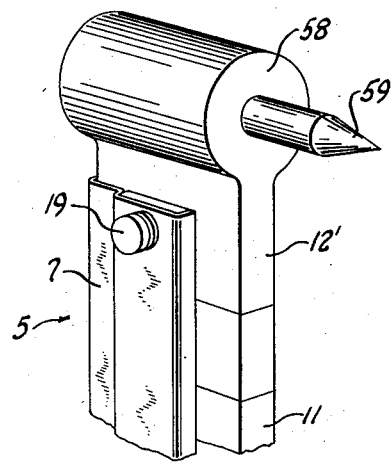
Figure 8 is a perspective view of a gaging instrumentality which may be used with the holder of this invention.

As pointed out above, the gaging end pieces used with the device of this invention may take several forms. A number of such instrumentalities are shown in my aforesaid copending application, and another is illustrated in Figure 8, wherein the gaging instrumentality 12' is formed to provide a bored holder 58 at its top in which a scribing point 59 may be removably held.

Figure 9:
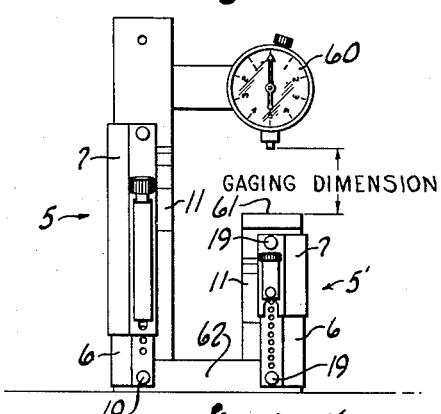
Figure 9 is a side elevational view of a gaging set-up wherein two gage block holders of this invention are employed with a dial gage for checking small gaging dimensions.

Figure 9 illustrates a set-up employing a dial gage 60 carried by the upper end piece of a holder such as shown in Figure 1, cooperable with a gaging surface 61 on the upper end piece of a holder 5' such as shown in Figure 6. The illustrative set-up in Figure 9 is intended for checking a gaging dimension smaller than that which might be measured with either of the holders alone, in view of the fact that the length of the channels in each holder imposes a practical limitation on its minimum gaging dimension. The two holders 5 and 5' are mounted on a common base block 62 having a pair of holes therein to receive their respective lower end pins 19, and which holds the two holders with the gaging surface 61 beneath the plunger of the dial gage. The gage block stacks in the two holders may be arbitrarily selected to suit the heights of the holders but the difference between the heights of the respective stacks must of course be such as to establish the desired gaging dimension.

From the foregoing description taken together with the accompanying drawings it will be apparent that this invention provides simple but sturdy and readily operable tension means for a gage block holder of the type comprising telescoping open-ended channels having gaging instrumentalities swivelably mounted in their remote ends, which tension means is capable of exerting a strong clamping pressure substantially on the center line of a stack of gage blocks in the holder, so that the gage blocks are securely held in place therein but are not subjected to uneven stresses which might tend to distort them and impair their dimensional precision.

What I claim as my invention is:

1. In a gage block holder of the type comprising inner and outer elongated open ended channels connected for endwise telescoping adjustment, and means at the remote ends of the channels for securing gaging end pieces thereto with a swivel connection, means for drawing the remote ends of said channels toward one another so that a stack of gage blocks in the channels may be clamped between the end pieces, said means comprising: a tension member overlying one side of the outer channel and having a dog engageable in any one of a series of longitudinally spaced holes in the inner channel through a lengthwise extending slot in the outer channel near the inner end thereof, and having a tension rod with its axis substantially perpendicular to that of said dog and lengthwise of the holder, said tension rod being threaded at its end portion remote from the dog; a bracket on said side of the outer channel intermediate said slot and the outer end of the channel, said bracket extending laterally outwardly from said channel and having a hole through which said rod extends and in which it is endwise slidable; and a nut on the threaded portion of the tension rod engageable with said bracket to draw the dog toward the bracket and thus draw the remote ends of the channels together.

2. The holder of claim 1, further characterized by a compression spring reacting between said bracket and the tension member to bias the tension member away from the bracket.

3. In a gage block holder of the type comprising inner and outer elongated open ended channels connected for endwise telescoping adjustment, and means at the remote ends of the channels for securing gaging end pieces thereto with a swivel connection, means for drawing the remote ends of said channels toward one another so that a stack of gage blocks in the channels may be clamped between the end pieces, said means comprising: a laterally extending bracket on the outer telescoping channel having a hole therethrough, the axis of the hole being substantially parallel to the length of the channel; a substantially channel shaped tension member having flanges loosely embracing said bracket and guided thereby for motion lengthwise of the channels; a dog at one end of the tension member, projecting inwardly from the web portion thereof, between the flanges and substantially parallel to them, said dog being engageable in any one of a series of longitudinally spaced holes in the inner channel through a lengthwise elongated slot in the outer channel; a tension rod having one end anchored to the tension member between its flanges and extending lengthwise thereof, toward the other end of the tension member, said tension rod having its other end portion threaded and slidable endwise in the hole in the bracket; a nut on the threaded end of the tension rod engageable with said bracket to draw the first named end of the tension member toward the bracket; and a compression spring reacting between said bracket and the tension member to bias the tension member lengthwise in the direction to carry the dog away from the bracket.

4. The holder of claim 3, further characterized by the provision of cooperating means on the bracket and tension member constraining the latter to motion lengthwise of the channel; and further characterized by the fact that said dog is endwise movably mounted in the tension member to facilitate its insertion into and withdrawal from a hole in the inner telescoping channel, and has an enlarged head at its inner end, cooperable with the edge of a hole in which it is received to prevent inadvertent withdrawal therefrom.

5. The holder of claim 4, further characterized by a shoulder on said dog facing the inner end thereof; and further characterized by a coiled compression spring encircling the dog and reacting between said shoulder and the tension member to bias the dog outwardly, away from the inner channel.

6. The holder of claim 3, further characterized by the fact that said dog is immovably secured to said one end of the tension member; and further characterized by the fact that the tension rod has a loose fit in the hole in the bracket so that said one end of the tension member may be moved laterally with respect to the channels to enable the dog thereon to be endwise inserted into and removed from a hole in the inner channel aligning with the dog.

7. In a gage block holder of the type comprising inner and outer elongated open ended channels connected for endwise telescoping adjustment, and means at the remote ends of the channels for securing gaging end pieces thereto with a swivel connection, means for drawing the remote ends of said channels toward one another so that a stack of gage blocks in the channels may be clamped between the end pieces, said means comprising: a U-shaped bracket having its bight secured to and extending laterally from the outer channel and having substantially straight legs extending lengthwise of the channel and spaced therefrom to define a slot; an elongated substantially channel shaped tension member loosely embracing said bracket and guided thereby for motion lengthwise of the channels; a dog fixed to one end portion of said tension member, and extending inwardly, substantially perpendicularly to the length of the tension member to be engageable through a lengthwise slot in the outer channel in any one of a series of longitudinally spaced holes in the inner channel; an anchor fixed to the tension member, bridging the flanges of said tension member intermediate the ends thereof, with a portion of the anchor loosely received in said slot; a threaded tension rod having one of its ends rigidly secured to said anchor and extending lengthwise of the tension member, between and parallel to the legs of the bracket and projecting loosely through said hole therein to mount the tension member on the bracket for endwise motion with respect to the outer channel and for limited swinging motion of the first designated end of the tension member toward and from the inner channel to carry the dog into and out of engagement with holes in the inner channel, the outward limit of such swinging motion being defined by engagement of said portion of the anchor with the legs of the bracket; a nut on the threaded end portion of the tension rod engageable with the bight of the bracket at the face thereof remote from said anchor so that rotation of the nut in one direction draws the tension member endwise in the direction to move the dog toward the bight of the bracket; and a compression spring reacting between the tension member and the bight of the bracket to yieldingly bias the tension member in the opposite direction.

8. The holder of claim 6 further characterized by a pilot carried by said anchor and engaging the coils of the compression spring remote from the bight of the bracket, said pilot being located between the tension rod and the adjacent side of the outer channel so as to bias said first designated end of the tension member and the dog thereon away from the inner channel.

9. In a gage block holder of the type comprising inner and outer elongated channels connected for endwise telescoping adjustment and having end pieces secured thereto at the remote ends of the channels, means for drawing the remote ends of said channels toward one another so that a stack of gage blocks in the channels may be clamped between the end pieces, said means comprising: a bracket fixed on the exterior of one of the channels; a rigid member mounted on said bracket for movement in opposite directions lengthwise of the channels and having a portion thereof projecting toward one end of said channel on which the bracket is mounted and overlying an exposed portion of the other channel; a dog on said projecting portion of said member mounted for movement toward and from said exposed portion of the other channel so as to be axially engageable and disengageable in any one of a series of longitudinally spaced holes in said other channel and movable with said member lengthwise of the channels; and means including a threaded element connected between said member and said bracket for driving said member in one of said directions in consequence of rotation of the threaded element in one direction to draw the remote ends of the channels toward one another when the dog is engaged in a hole in the exposed portion of said other channel member.

10. In a gage block holder of the type comprising inner and outer elongated channels connected for endwise telescoping adjustment and having end pieces secured thereto at the remote ends of the channels, means for drawing the remote ends of said channels toward one another so that a stack of gage blocks in the channels may be clamped between the end pieces, said means comprising: a bracket fixed on the exterior of one of the channels; a dog; supporting means mounting the dog on said first designated channel over an exposed portion of said other channel for motion lengthwise of the channel and for motion in directions generally crosswise of the channel toward and from said exposed portion of said other channel, said latter motion permitting the dog to be axially engaged in any one of a series of longitudinally spaced holes in said other channel, said supporting means including a rigid member guidingly supported on the bracket for motion lengthwise of the channel, and screw threaded means connected between said supporting member and the bracket for positively propelling said supporting means and the dog thereon in one direction lengthwise of the channel in consequence of rotation of the threaded element in one direction to draw the remote ends of the channels toward one another when the dog is engaged in a hole in the exposed portion of said other channel member.

11. In a gage block holder of the type comprising inner and outer elongated channels connected for endwise telescoping adjustment and having end pieces secured at the remote ends of the channels, means for drawing the remote ends of said channels toward one another so that a stack of gage blocks in the channels may be clamped between the end pieces, said means comprising: a dog drivingly engageable with one of said channels at any of a number of points along its length and through which force may be applied to telescope said designated channel into the other channel so as to thus draw the end pieces toward each other into clamping engagement with the ends of a stack of gage blocks in the holder; a bracket fixed on the exterior of said other channel; and means including a screw and a nut threaded thereon connected between said dog and the bracket for positively propelling said dog in the direction lengthwise of the channel to effect convergence of the end pieces whereby they clampingly hold a stack of gage blocks between them.

References Cited in the file of this patent

UNITED STATES PATENTS

| | | |
|---|---|---|
| 2,642,668 | Dorel | June 23, 1953 |
| 2,680,911 | Gierlich | June 15, 1954 |